United States Patent
Broas

(10) Patent No.: US 9,619,263 B2
(45) Date of Patent: Apr. 11, 2017

(54) USING COOPERATIVE GREEDY BALLOONING TO REDUCE SECOND LEVEL PAGING ACTIVITY

(75) Inventor: Kevin Broas, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 207 days.

(21) Appl. No.: 13/158,375

(22) Filed: Jun. 11, 2011

(65) Prior Publication Data

US 2012/0317331 A1    Dec. 13, 2012

(51) Int. Cl.
| | |
|---|---|
| G06F 12/00 | (2006.01) |
| G06F 13/00 | (2006.01) |
| G06F 13/28 | (2006.01) |
| G06F 9/455 | (2006.01) |

(52) U.S. Cl.
CPC ........... *G06F 9/45558* (2013.01); *G06F 2009/45583* (2013.01)

(58) Field of Classification Search
CPC ............ G06F 1009/45583; G06F 9/45558
USPC ........................................................ 711/6
See application file for complete search history.

(56) References Cited

U.S. PATENT DOCUMENTS

| | | | | |
|---|---|---|---|---|
| 6,789,156 | B1 * | 9/2004 | Waldspurger | 711/6 |
| 7,433,951 | B1 * | 10/2008 | Waldspurger | 709/226 |
| 7,702,843 | B1 * | 4/2010 | Chen et al. | 711/6 |
| 7,979,857 | B2 * | 7/2011 | Esfahany et al. | 718/1 |
| 8,095,931 | B1 * | 1/2012 | Chen et al. | 718/104 |
| 8,533,383 | B2 * | 9/2013 | Ohrstrom et al. | 711/6 |
| 8,583,875 | B1 * | 11/2013 | Garthwaite et al. | 711/147 |
| 2004/0064668 | A1 * | 4/2004 | Kjos et al. | 711/202 |
| 2004/0143664 | A1 * | 7/2004 | Usa et al. | 709/226 |
| 2005/0232192 | A1 * | 10/2005 | Rawson, III | 370/329 |
| 2007/0101098 | A1 | 5/2007 | Shin et al. | |
| 2008/0005489 | A1 * | 1/2008 | Watkins et al. | 711/147 |
| 2009/0307436 | A1 | 12/2009 | Larson et al. | |
| 2010/0169536 | A1 * | 7/2010 | Shedel et al. | 711/6 |
| 2010/0241785 | A1 * | 9/2010 | Chen et al. | 711/6 |
| 2010/0332910 | A1 * | 12/2010 | Ali et al. | 714/45 |
| 2011/0082962 | A1 * | 4/2011 | Horovitz | G06F 11/301 |
| | | | | 711/6 |
| 2011/0246986 | A1 * | 10/2011 | Nicholas et al. | 718/1 |
| 2011/0320682 | A1 * | 12/2011 | McDougall et al. | 711/6 |
| 2012/0110577 | A1 * | 5/2012 | Chen et al. | 718/1 |

(Continued)

OTHER PUBLICATIONS

Kloster, et al., "Efficient Memory Sharing in the Xen Virtual Machine Monitor", Retrieved at << http://mejlholm.org/uni/pdfs/dat5.pdf >>, Jan. 2006, pp. 86.

(Continued)

*Primary Examiner* — Sheng-Jen Tsai
(74) *Attorney, Agent, or Firm* — John Jardine; Daniel Choi; Micky Minhas

(57) ABSTRACT

In one embodiment, a virtual machine manager may use dynamic memory balancing and greedy ballooning to improve guest memory performance. A memory 130 may have a system memory page set with a system memory page set size associated with the virtual machine to support a guest memory page set of the virtual machine with a guest memory page set size. A processor 120 may instruct the virtual machine to execute a reduction of the guest memory page set size. The processor 120 may maintain the system memory page set size during the reduction.

20 Claims, 8 Drawing Sheets

(56) References Cited

U.S. PATENT DOCUMENTS

| | | | |
|---|---|---|---|
| 2012/0144391 A1* | 6/2012 | Ueda | 718/1 |
| 2012/0233435 A1* | 9/2012 | Ben-Yehuda et al. | 711/170 |
| 2012/0290765 A1* | 11/2012 | Durrant | 711/6 |
| 2014/0379955 A1* | 12/2014 | Dong et al. | 711/6 |

OTHER PUBLICATIONS

Waldspurger, Carl A., "Memory Resource Management in VMware ESX Server", Retrieved at << http://www.waldspurger.org/carl/papers/esx-mem-osdi02.pdf >>, In Proceedings of the 5th symposium on Operating systems design and implementation, Dec. 2002, p. 1-14.

"Performance Best Practices for VMware vSphere® 4.0", Retrieved at << http://www.vmware.com/pdf/Perf_Best_Practices_vSphere4.0.pdf >>, Retrieved Date: Mar. 24, 2011, p. 1-54.

Lu, et al., "Virtual Machine Memory Access Tracing With Hypervisor Exclusive Cache1", Retrieved at << http://www.usenix.org/event/usenix07/tech/full_papers/lu/lu_html/usenix07.html >>, Retrieved Date: Mar. 24, 2011, pp. 14.

"Ballooning", Retrieved at << http://www.usenix.org/events/osdi02/tech/full_papers/waldspurger/waldspurger_html/node6.html >>, Retrieved Date: Mar. 24, 2011, pp. 3.

* cited by examiner

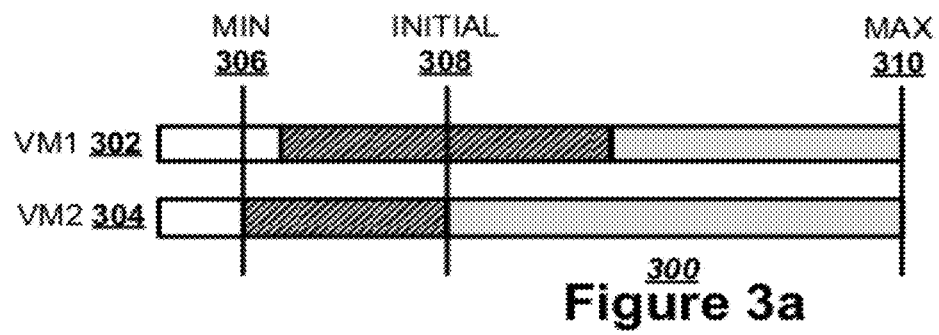
Figure 3a
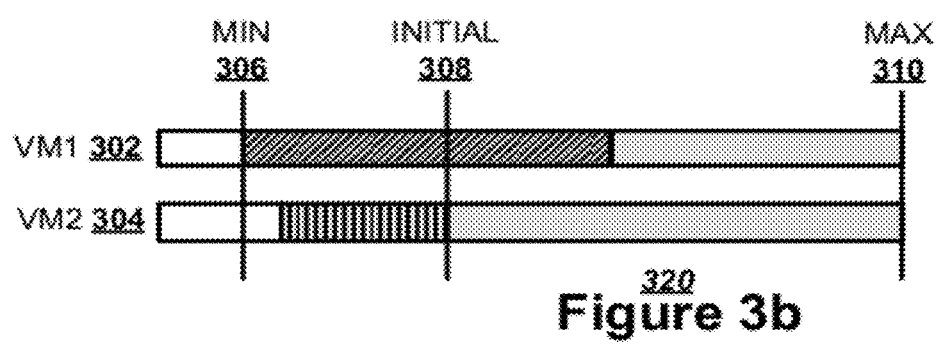
Figure 3b
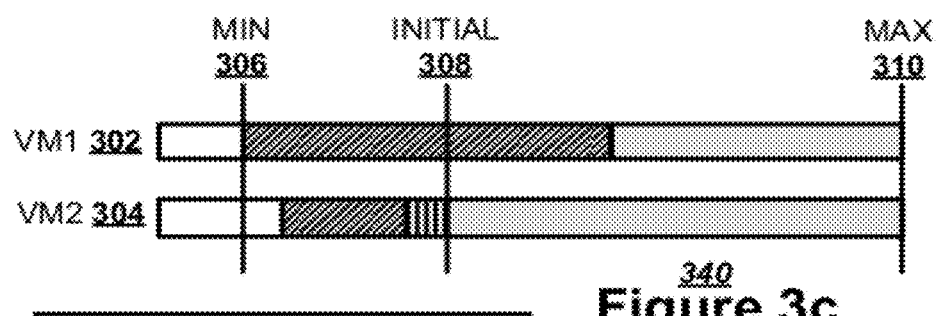
Figure 3c
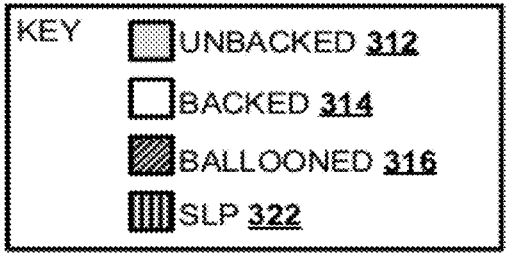

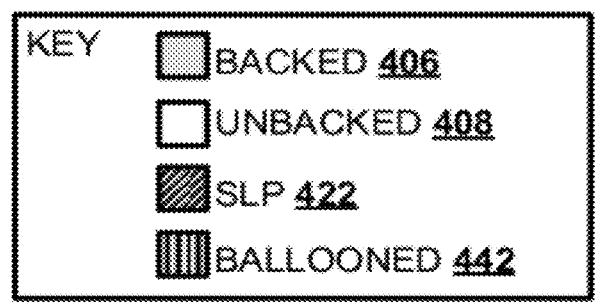

USING COOPERATIVE GREEDY BALLOONING TO REDUCE SECOND LEVEL PAGING ACTIVITY

BACKGROUND

An application running on a computer may expand the memory capabilities of that computer by implementing a virtual machine. The virtual machine may be a virtual operating system run by the actual operating system of the computer, either as a hardware virtualization or a software emulation. The virtual machine may divide a guest memory into a set of guest memory pages, just as the computer may divide the actual memory into a set of system memory pages. A guest memory page of the guest memory may be backed by a system memory page.

The number of system memory pages assigned to a virtual machine may be smaller than the number of guest memory pages used by the virtual machine. The virtual machine may use second level paging to back a guest memory page that has yet to be assigned a system memory page. In second level paging, when a guest memory page is to perform a memory operation and all the system pages are in use, a previously used system memory page may have the data stored on it written to the computer hard drive and the guest memory page assigned to the now freed system memory page.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to using dynamic memory balancing and greedy ballooning to improve guest memory performance. A memory may have a system memory page set having a system memory page set size associated with the virtual machine to support a guest memory page set of the virtual machine having a guest memory page set size. A processor may instruct the virtual machine to execute a reduction of the guest memory page set size. The processor may maintain the system memory page set size during the reduction.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIGS. 3a-c illustrate, in three block diagrams, embodiments of a virtual machine mapping using ballooning.

FIGS. 4a-d illustrate, in four block diagrams, embodiment of a virtual machine mapping using greedy ballooning.

Figure 5:
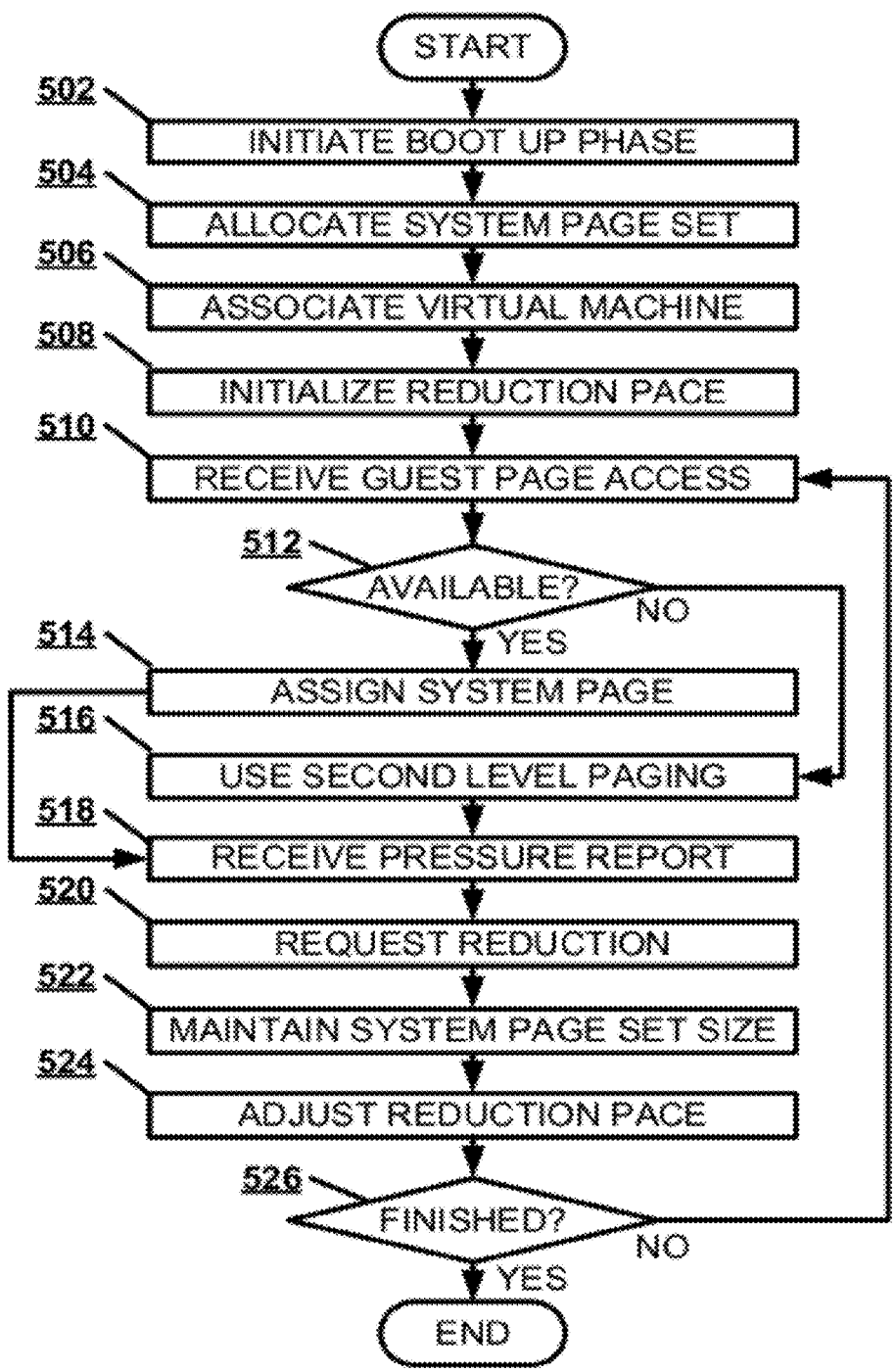

FIG. 5 illustrates, in a flowchart, one embodiment of a method of greedy ballooning performed by the virtual machine worker process during a boot up phase.

Figure 6:
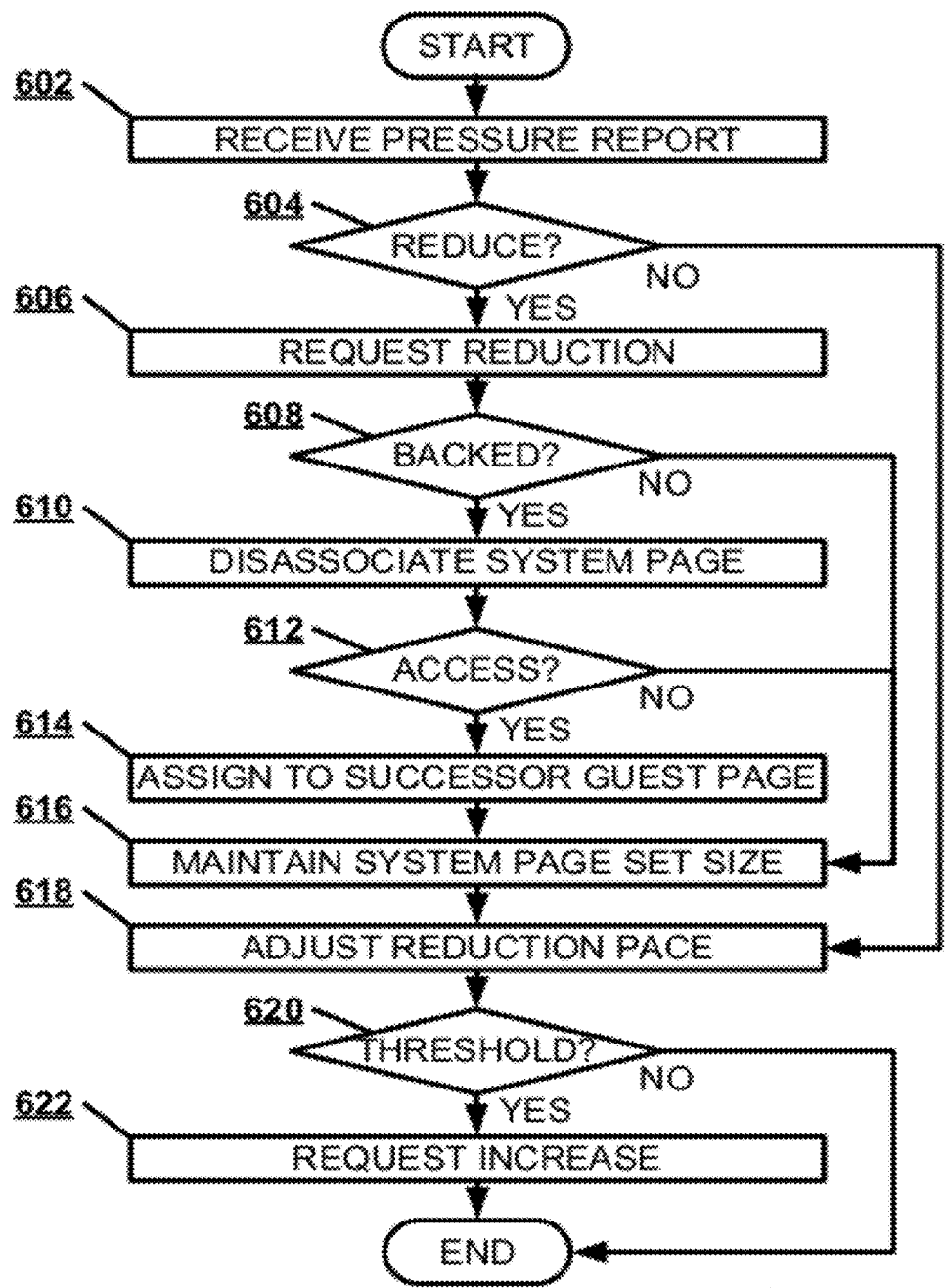

FIG. 6 illustrates, in a flowchart, one embodiment of a method of greedy ballooning performed by the virtual machine worker process during normal operation.

Figure 7:
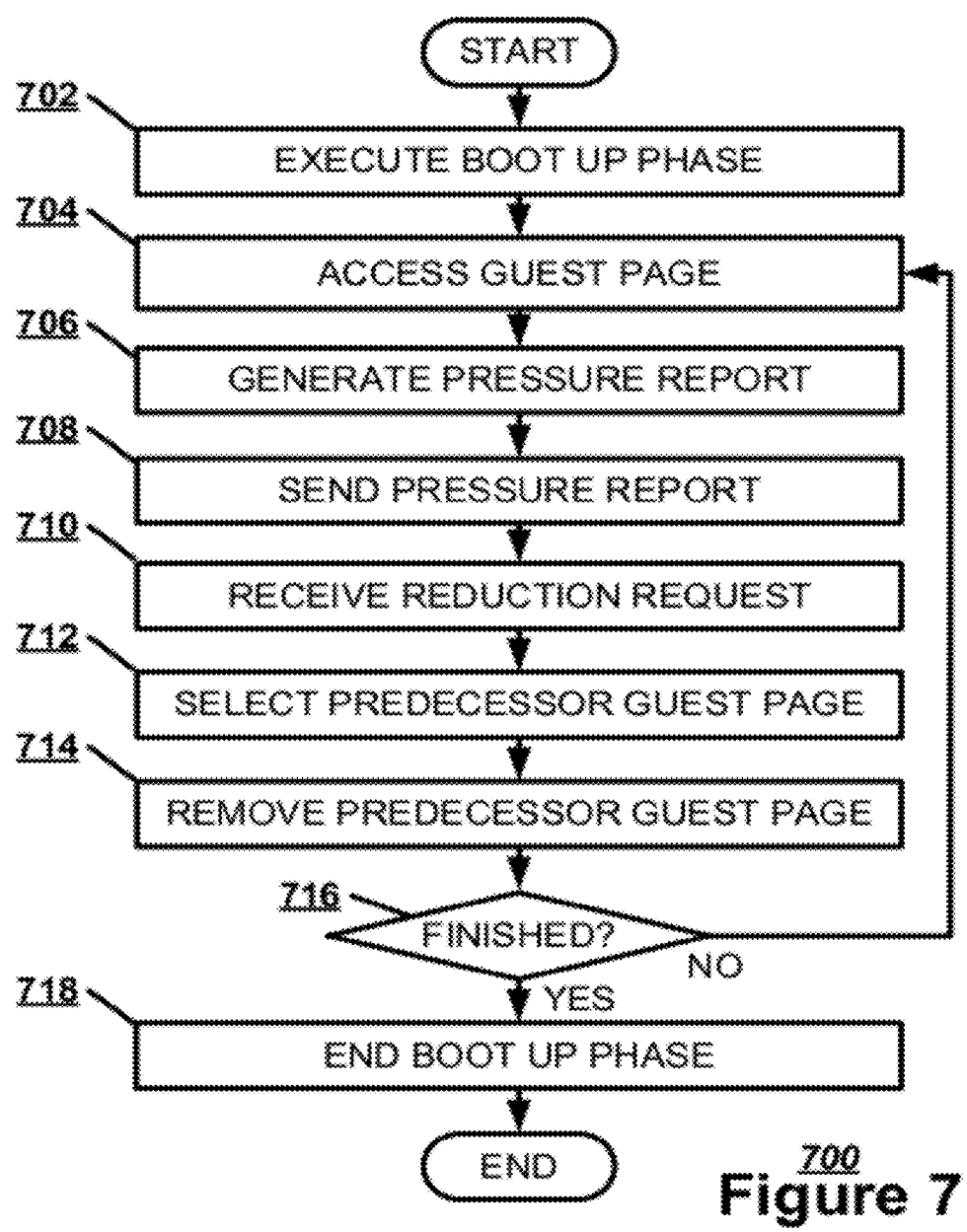

FIG. 7 illustrates, in a flowchart, one embodiment of a method of greedy ballooning performed by a virtual services consumer on a virtual machine during boot up phase.

Figure 8:
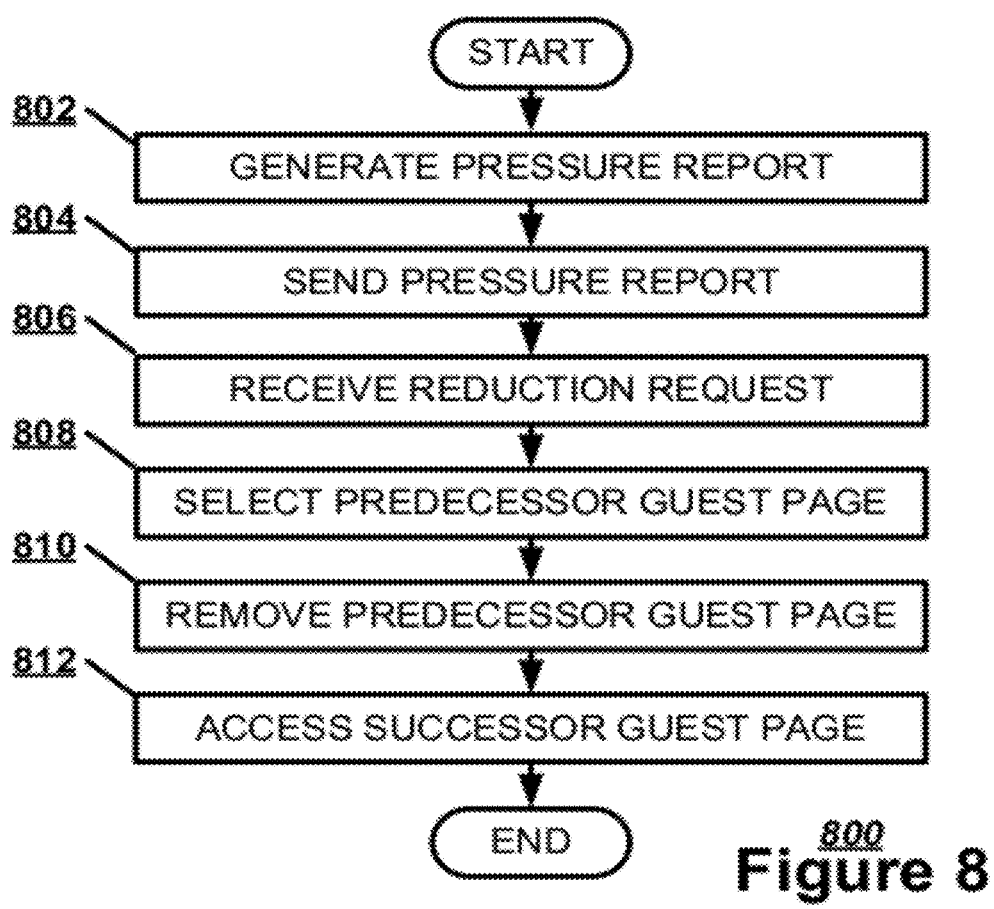

FIG. 8 illustrates, in a flowchart, one embodiment of a method of greedy ballooning performed by a virtual services consumer on a virtual machine during normal operation.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a virtual machine manager for a computing device.

A virtual machine manager may use dynamic memory to assign varying amounts of memory to a virtual machine based on current memory pressure, system memory availability, and policy driven balancing heuristics. A memory may be divided into a memory unit called "pages". Dynamic memory enabled virtual machines may have an initial memory size but may shrink, through ballooning, or grow, through un-ballooning or hot-adds, as guest operating systems are controlled by the system during runtime. A guest enlightenment is an element of an operating system optimized to execute in a virtual machine environment. A ballooning operation is the removal of one or more guest memory pages. An un-ballooning operation is the return of a removed guest memory page to a guest memory page set assigned to a virtual machine, while a hot add is the addition of further guest memory pages to the initial guest memory page set assigned to a virtual machine. If insufficient physical memory is available for a virtual machine, the virtual machine manager may implement second level paging to compensate for the shortage. Second level paging virtualizes memory for a guest memory page using a slower secondary data storage media, such as a hard drive, instead of a quicker random access media. Also, as second level paging supports a guest memory page with an indeterminate system memory page, second level paging may lead to high page fault rate. The guest memory page is a page of the guest memory represented in the virtual machine. The system memory page is a page of the actual physical memory that supports a guest memory page.

The virtual machine manager may use cooperative "greedy ballooning" to reduce second level paging situations within the guest memory. In regular ballooning, the guest operating system may reduce the number of guest memory pages to free up a system memory page that may be reassigned to a different virtual machine. In cooperative ballooning, the guest operating system selects the guest memory page to be returned to the host operating system. The guest operating system may be better placed to determine which guest memory page is the most appropriate candidate for allocation. In cooperative greedy ballooning, the guest operating system may reduce the number of guest memory pages while maintaining the system memory page set size. Any system memory page supporting a guest memory page that gets ballooned remains with the virtual machine. Thus, the host operating system may more efficiently allocate the system memory pages to support the guest memory pages, reducing second level paging activities.

The host operating system, acting as a virtual machine manager, may perform an allocation during run time and also during a boot up phase of the virtual machine. The virtual machine manager may back a guest memory page on an on-demand basis, backing the guest memory page when the virtual machine performs a memory access, such as a read or a write.

During boot completion, the guest operating system may zero the guest memory for initial use, leading to a heavy amount of demand backing. The virtual machine manager may sidestep this by performing greedy ballooning, or an allocation, without execution of a zeroing operation on the guest memory page, reducing the number of faults.

Additionally, the virtual machine manager may throttle the rate of greedy ballooning to avoid an allocation failure inside the guest operating system and reduce memory pressure. The virtual machine manager may evaluate the guest operating system memory pressure information and the second level paging activity for a virtual machine to determine if the allocation request pace may be adjusted.

Thus, in one embodiment, a virtual machine manager may use dynamic memory balancing and greedy ballooning to improve guest memory performance. A memory may have a system memory page set with a system memory page set size associated with the virtual machine to support a guest memory page set of the virtual machine with a guest memory page set size. A processor may instruct the virtual machine to execute a reduction of the guest memory page set size. The processor may maintain the system memory page set size during the reduction.

Figure 1:
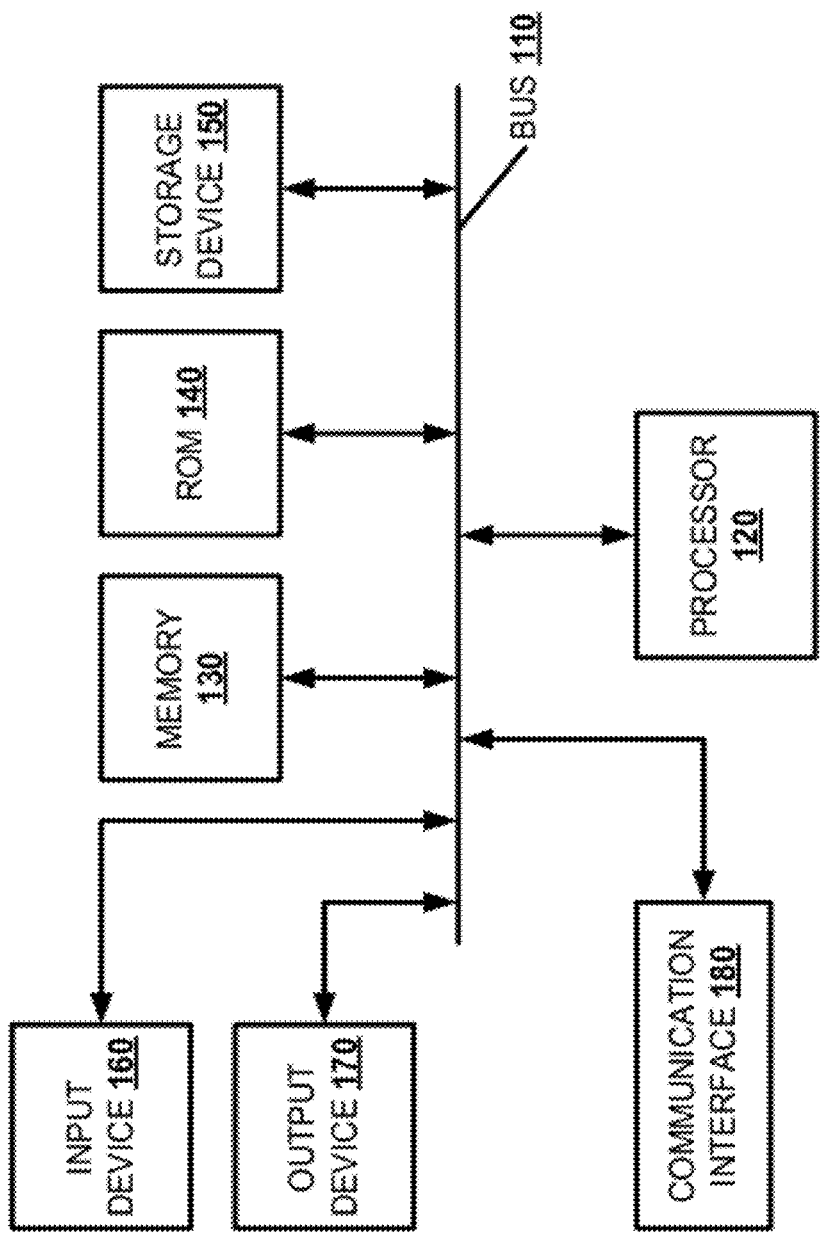
FIG. 1 illustrates, in a block diagram, one embodiment of a computing device.

FIG. 1 illustrates a block diagram of an exemplary computing device 100 which may act as virtual machine environment. The computing device 100 may combine one or more of hardware, software, firmware, and system-on-a-chip technology to implement virtual machine management. The computing device 100 may include a bus 110, a processor 120, a memory 130, a read only memory (ROM) 140, a storage device 150, an input device 160, an output device 170, and a communication interface 180. The bus 110 may permit communication among the components of the computing device 100.

The processor 120 may include at least one conventional processor or microprocessor that interprets and executes a set of instructions. The memory 130 may be a random access memory (RAM) or another type of dynamic storage device that stores information and instructions for execution by the processor 120. The memory 130 may also store temporary variables or other intermediate information used during execution of instructions by the processor 120. The ROM 140 may include a conventional ROM device or another type of static storage device that stores static information and instructions for the processor 120. The storage device 150 may include any type of tangible machine-readable medium, such as, for example, magnetic or optical recording media and its corresponding drive. The storage device 150 may store a set of instructions detailing a method that when executed by one or more processors cause the one or more processors to perform the method.

The input device 160 may include one or more conventional mechanisms that permit a user to input information to the computing device 100, such as a keyboard, a mouse, a voice recognition device, a microphone, a headset, etc. The output device 170 may include one or more conventional mechanisms that output information to the user, including a display, a printer, one or more speakers, a headset, or a medium, such as a memory, or a magnetic or optical disk and a corresponding disk drive. The communication interface 180 may include any transceiver-like mechanism that enables processing device 100 to communicate with other devices or networks. The communication interface 180 may include a network interface or a mobile transceiver interface. The communication interface 180 may be a wireless, wired, or optical interface.

The computing device 100 may perform such functions in response to processor 120 executing sequences of instructions contained in a computer-readable medium, such as, for example, the memory 130, a magnetic disk, or an optical disk. Such instructions may be read into the memory 130 from another computer-readable medium, such as the storage device 150, or from a separate device via the communication interface 180.

Figure 2:
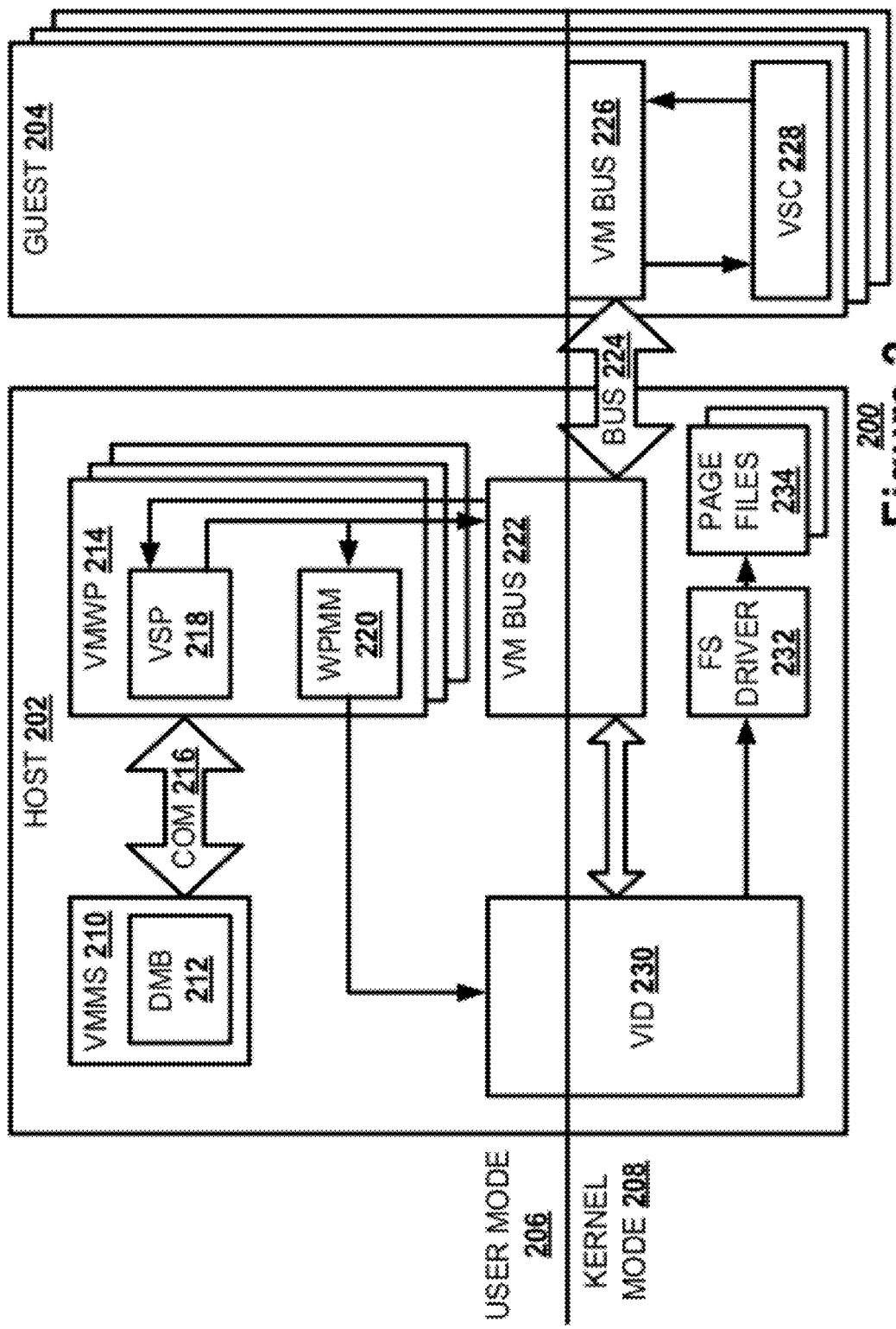
FIG. 2 illustrates, in a block diagram, one embodiment of a virtual machine environment system architecture.

FIG. 2 illustrates, in a block diagram, one embodiment of a virtual machine environment system architecture 200. The virtual machine environment system architecture 200 may have a host operating system 202 and a set of one or more guest operating systems 204. The host operating system 202 is a set of code connecting a software application in the user mode 206 with the actual hardware calculations made at the kernel mode 208. Similarly, a guest operating system 204 connects a software application in the user mode 206 with a virtual machine simulating hardware activity in the kernel mode 208. The guest operating system 204 may be optimized to run a guest enlightenment 204. The guest enlightenment factors in the functions of the virtual machine to more efficiently run the operating system.

A virtual machine management system (VMMS) 210 may monitor and control the actions of the virtual machines operated by the guest operating systems 204. The virtual machine manager may execute a dynamic memory balancer (DMB) 212 to apply heuristics that control the movement of memory between the virtual machines. The virtual machine management system 210 may communicate with a virtual machine worker process (VMWP) 214 over a communication link (COM) 216. The virtual machine worker process 214 may implement a virtualization service provider (VSP) 218 and a worker process memory manager (WPMM) 220. A host virtual machine bus interface 222 may operate a virtual bus 224 with a guest virtual machine bus interface 226. The guest virtual machine bus interface 228 may communicate with a virtualization service consumer (VSC) 228. The virtualization service consumer 228 may frequently compile a memory use pressure report to be sent back over the virtual bus 224 to the virtualization service provider 218. The virtualization service provider 218 may communicate the memory pressure report back to the dynamic memory balancer 212. The dynamic memory balancer 212 may determine a set of dynamic memory balancing operations for the host operating system 202 and the guest operating system 204 to perform. The dynamic memory balancer 212 may send these dynamic memory balancing operations to the virtualization service provider 218. The virtualization service provider 218 may forward these dynamic memory balancing operations back across the virtual bus 224 to the virtualization service consumer 228. The virtualization service consumer 228 is a guest enlightenment that may then implement any dynamic memory balancing operations that are executed for the guest operating system 204.

The virtualization service provider 218 may provide the dynamic memory balancing operations to be executed by the host operating system 202 to the worker process memory manager 220. The worker process memory manager 220 may forward the dynamic memory balancing operations to a virtualization infrastructure driver 230. The virtualization infrastructure driver (VID) 230 executes host operations that allow for efficient use of the virtual machines. The virtualization infrastructure driver 230 may use the dynamic memory balancing operations to formulate a paging input/output command to be sent to the file system (FS) driver 232. The virtualization infrastructure driver 230 may divide the system memory into one or more page files 234. Each of these page files 234 may be used to back a memory page file in a virtual machine, as determined by the dynamic memory balancing operation. A virtual machine may have a limited number of system memory pages backing the guest memory pages of the virtual machine.

Sometimes a virtual machine may use more guest memory pages than the system memory pages allocated by the virtual machine management system 210 for backing. If a guest memory page is not backed by a system memory page, the virtual machine may fault when attempting to perform an operation on that guest memory page. The virtual machine management system 210 may use a combination of hot adding, ballooning, un-ballooning, and second level paging in response. A "hot add" is the assignment of additional guest memory pages to the virtual machine beyond the initial assignment of guest memory pages. Ballooning is the removal, or allocation, of a guest memory page from a virtual machine, allowing the backing system memory page for that guest memory page to be reassigned to a different virtual machine or to the host operating system. Un-ballooning is the return of one or more of those removed guest memory pages to the virtual machine. Second level paging is the assignment of a guest memory page to a system memory page previously assigned to a guest memory page in the same machine. The data provided by the previous guest memory page may be written to hard disk, which may be time consuming.

FIGS. 3a-c illustrate an example of these operations during a reset of a virtual machine. FIG. 3a illustrates, in a block diagram, virtual machines in an active state 300. In this example, the virtual machine management system 210 may be controlling a first virtual machine 302 and a second virtual machine 304. Each virtual machine may have a minimum memory page backing level 306, an initial memory page backing level 308, and a maximum memory page backing level 310. The minimum memory page backing level 306 represents the least number of guest memory pages that may be backed while the virtual machine is still operable. The initial memory page backing level 308 represents the least number of guest memory pages that may be backed during boot up of the virtual machine. The maximum memory page backing level 310 represents the most guest memory pages available to the virtual machine.

The first virtual machine 302 may have a number of unbacked guest memory pages 312. The first virtual machine 302 may have a set of backed guest memory pages 314 that exceeds the minimum memory page backing level 306 but is less than initial memory page backing level 308. The first virtual machine 302 may have a number of ballooned guest memory pages 316.

The second virtual machine 304 may have a number of unbacked guest memory pages 312. The second virtual machine 304 may have a set of backed guest memory pages 314 that equals the minimum memory page backing level 306. The first virtual machine 302 may balloon the guest memory pages 316 between the minimum memory page backing level 306 and the initial memory page backing level 308.

The second virtual machine 304 may be reset and rebooted 320, as shown in FIG. 3b. The first virtual machine 202 may balloon 316 any backed guest memory pages 314 that exceed the minimum memory page backing level 306. The virtual machine management system 210 may use the freed system memory pages to back some guest memory pages 314 in the second virtual machine 304. The second virtual machine 304 may use second level paging (SLP) guest memory pages 322 to reach the initial memory page backing level 308.

Once the second virtual machine 304 has completed rebooting, the second virtual machine 304 may use greedy ballooning 340 to reduce the stress of second level paging, as shown in FIG. 3c. The second virtual machine 304 may replace some of the second level paging guest memory pages 322 with ballooned guest memory pages 316.

The virtual machine worker process 214 may use a process called "greedy ballooning" to more effectively manage the memory of the virtual machine. In regular ballooning, a virtual machine may allocate a guest memory page to the virtual machine management system 210 so the associated backing system memory page may be used by a different virtual machine. In greedy ballooning, a virtual machine may allocate a guest memory page to the virtual machine worker process 214 so the associated backing system memory page may be used by the same virtual machine but with a different guest memory page.

FIGS. 4a-d illustrate a virtual machine manager mapping using greedy ballooning. FIG. 4a shows an initial virtual machine manager mapping 400. The virtual machine may have a set of guest memory pages (GMP) 402 supported by a set of system memory pages (SMP) 404 controlled by the virtual machine management system 210. In this example, the guest memory pages 402 at the 0, 1, 7, and 10 positions may be backed 406 by the system memory pages 404 at the 0, 1, 2, and 3 positions respectively. The guest memory pages 402 at the 2, 3, 4, 5, 6, 8, 9, and 11 positions may be unbacked 408.

FIG. 4b shows a second level paging virtual machine manager mapping 420. In this example, the guest memory pages 402 at the 0, 6, 8, 10, 4, and 3 positions may be backed 406 by the system memory pages 404 at the 0, 1, 2, 3, 4, and 5 positions, respectively. The guest memory pages 402 at the 2, 5, 9, and 11 positions may be unbacked 408. The guest memory pages 402 at the 1 and 7 positions may be no longer backed as part of second level paging 422. The data stored in the system memory pages 404 at the 1 and 2 positions as part of backing the guest memory pages 402 at the 1 and 7 positions may be written to hard disk.

FIG. 4c shows a greedy ballooning virtual machine manager mapping 440. In this example, the guest memory pages 402 at the 0, 8, 10, and 4 positions may be backed 406 by the system memory pages 404 at the 0, 2, 3, and 4 positions, respectively. The guest memory pages 402 at the 2, 5, 9, and 11 positions may be unbacked 408. The guest memory pages 402 at the 1, 3, 6, and 7 positions may be greedy ballooned 442, or allocated back to the virtual machine worker process 214.

FIG. 4d shows a reassignment virtual machine manager mapping 460. In this example, the guest memory pages 402 at the 0, 11, 8, 10, and 4 positions may be backed 406 by the system memory pages 404 at the 0, 1, 2, 3, 4, and 5 positions, respectively. The guest memory pages 402 at the 5 and 9 positions may be unbacked 408. The guest memory pages 402 at the 1, 3, 6, and 7 positions may be greedy ballooned 442, or allocated back to the virtual machine worker process 214. The system memory pages 404 at the 1 and 5 positions may be reassigned to the guest memory pages at the 11 and 2 positions, respectively.

FIG. 5 illustrates, in a flowchart, one embodiment of a method 500 of greedy ballooning performed by the host operating system 202 during the boot up phase. The boot up phase describes the period when the host operating system 202 is establishing a virtual machine. The virtual machine management system 210 may initiate a boot up phase of a virtual machine (Block 502). The virtual machine management system 210 may allocate a system memory page set having a system memory page set size to the virtual machine (Block 504). The virtual machine management system 210 may associate the system memory page set with the virtual machine to support a guest memory page set of the virtual machine having a guest memory page set size (Block 506). The virtual machine worker process 214 may initialize a reduction request pace (Block 508). The reduction request pace is the rate at which the virtual machine worker process requests a virtual machine to execute a reduction. The initial reduction request pace may start at zero. The virtual machine worker process 214 may receive an access of a guest memory page from the guest operating system 204 at any time (Block 510). If the system memory page set has available system memory pages (Block 512), the virtual machine worker process 214 may assign a system memory page to the guest memory page (Block 514). If the system memory page set does not have available system memory pages (Block 512), the virtual machine worker process 214 may use second level paging to support the guest memory page (Block 516). The virtual machine worker process 214 may receive a memory use pressure report about the virtual machine (Block 518). The memory use pressure report indicates the amount of guest memory use by the virtual machine. The virtual machine worker process 214 may decide to request the virtual machine to execute a reduction of the guest memory page set size (Block 520). The virtual machine worker process 214 may maintain the system memory page set size during the reduction (Block 522). Such reduction requests, or "greedy ballooning", may also occur in the absence of a memory user pressure report or a guest memory page access. The virtual machine worker process 214 may adjust the reduction request pace based on second level paging activity or the memory use pressure report (Block 524). If the boot up phase is not finished (Block 526), the virtual machine worker process 214 may receive the next guest memory page access from the guest operating system 204 (Block 508).

FIG. 6 illustrates, in a flowchart, one embodiment of a method of greedy ballooning performed by the virtual machine worker process during normal operation. The virtual machine worker process 214 may receive a memory use pressure report about the virtual machine (Block 602). If the memory use pressure report indicates that a reduction would be useful (Block 604), the virtual machine worker process 214 may request the virtual machine to execute a reduction of the guest memory page set size (Block 606). If the selected predecessor guest memory page is backed by a system memory page (Block 608), the virtual machine worker process 214 may disassociate the system memory page assigned to the predecessor guest memory page (Block 610). If a successor guest memory page is accessed by the virtual machine (Block 612), the virtual machine worker process 214 may then assign the system memory page to a successor guest memory page (Block 614). The virtual machine worker process 214 may maintain the system memory page set size during the reduction (Block 616). The virtual machine worker process 214 may adjust the reduction request pace (Block 618). If the memory use pressure report indicates memory use pressure above a pressure threshold (Block 620), the virtual machine worker process 214 may request the virtual machine to execute an increase of the guest memory page set size (Block 622).

FIG. 7 illustrates, in a flowchart, one embodiment of a method 700 of greedy ballooning performed by a virtual services consumer 228 on a virtual machine during boot up phase. The guest operating system 204 may execute a boot up phase of a virtual machine (Block 702). The guest operating system 204 may access a guest memory page 402 (Block 704). The guest operating system 204 may generate a memory use pressure report about the virtual machine (Block 706). The guest operating system 204 may send the memory use pressure report (Block 708). The guest operating system 204 may receive a reduction request from the virtual machine worker process 214 (Block 710). The guest operating system 204 may select the predecessor guest memory page 402 for removal by the virtual service consumer 228 to reduce the guest memory page set size (Block 712). The guest operating system 204 may remove the selected predecessor guest memory page 402 from the guest memory page set without execution of a zeroing operation (Block 714). If the boot up phase is finished (Block 716), the guest operating system 204 may end the boot up phase (Block 718).

FIG. 8 illustrates, in a flowchart, one embodiment of a method 800 of greedy ballooning performed by a virtual services consumer 228 on a virtual machine during normal operation. The guest operating system 204 may generate a memory use pressure report about the virtual machine (Block 802). The guest operating system 204 may send the memory use pressure report (Block 804). The guest operating system 204 may receive a reduction request from the virtual machine worker process 214 (Block 806). The guest operating system 204 may select the predecessor guest memory page 402 for removal by the virtual service consumer 228 to reduce the guest memory page set size (Block 808). The guest operating system 204 may remove the selected predecessor guest memory page 402 from the guest memory page set (Block 810). The guest operating system 204 may access a successor guest memory page (Block 812).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a general purpose or special purpose computer. By way of example, and not limitation, such non-transitory computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

I claim:

1. A machine-implemented method for managing a virtual machine, comprising:
   allocating, with a virtual machine management system of a host operating system, a system memory page set to the virtual machine to support a guest memory page set of the virtual machine;
   requesting, with a virtual machine worker process of the host operating system, the virtual machine to select a predecessor guest memory page of the guest memory page set to greedy balloon;
   disassociating, with the virtual machine worker process, a backing system memory page of the system memory page set from the predecessor guest memory page of the guest memory page set for use by a successor guest memory page of the guest memory page set for the virtual machine; and
   maintaining, with the virtual machine worker process, a system memory page set size of the system memory page set allocated to the virtual machine to support the guest memory page set during greedy ballooning.

2. The method of claim 1, further comprising:
   deciding with the virtual machine worker process to request greedy ballooning.

3. The method of claim 1, further comprising:
   executing greedy ballooning during a boot up phase of the virtual machine.

4. The method of claim 1, wherein a guest memory page is greedy ballooned without execution of a zeroing operation.

5. The method of claim 1, further comprising:
   assigning the backing system memory page to the successor guest memory page upon access by the virtual machine.

6. The method of claim 1, further comprising:
   using second level paging to support a guest memory page of the guest memory page set.

7. The method of claim 6, further comprising:
   adjusting a reduction request pace of the virtual machine worker process based on second level paging activity.

8. The method of claim 1, further comprising:
   receiving a memory use pressure report about the virtual machine.

9. The method of claim 8, further comprising:
   adjusting a reduction request pace of the virtual machine worker process based on the memory use pressure report.

10. The method of claim 8, further comprising:
    requesting the virtual machine to execute an increase of the guest memory pages based on the memory use pressure report.

11. A tangible machine-readable medium having a set of instructions detailing a method stored thereon that when executed by one or more processors cause the one or more processors to perform the method, the method comprising:
    allocating, with a virtual machine management system of the host operating system, a system memory page set to the virtual machine to support a guest memory page set of the virtual machine;
    deciding with a virtual machine worker process of the host operating system to request greedy ballooning of the guest memory page set;
    requesting the virtual machine to select a predecessor guest memory page of the guest memory page set for greedy ballooning;
    disassociating, with the virtual machine worker process, a backing system memory page of the system memory page set from a predecessor guest memory page of the guest memory page set for use by a successor guest memory page of the guest memory page set for the virtual machine; and
    maintaining, with the virtual machine worker process, a system memory page set size of the system memory page set allocated to the virtual machine to support the guest memory page set during greedy ballooning.

12. The tangible machine-readable medium of claim 11, wherein the method further comprises:
    assigning the backing system memory page to the successor guest memory page upon access by the virtual machine.

13. The tangible machine-readable medium of claim 11, wherein the method further comprises:
    receiving a memory use pressure report about the virtual machine.

14. The tangible machine-readable medium of claim 13, wherein the method further comprises:
    adjusting a reduction request pace of the virtual machine worker process based on the memory use pressure report.

15. The tangible machine-readable medium of claim 13, wherein the method further comprises:

requesting the virtual machine to execute an increase of the guest memory pages based on the memory use pressure report.

16. A virtual machine manager, comprising:

a memory configured to store a system memory page of a system memory page set assigned to a predecessor guest memory page of a guest memory page set of a virtual machine; and a processor configured to execute a host operating system having a virtual machine management system communicating with a virtual machine worker process to:

greedy balloon the guest memory page set by disassociating the system memory page from the predecessor guest memory page from the guest memory page set, assign the system memory page to a successor guest memory page of the guest memory page set, and maintain a system memory page set size of the system memory page set allocated to the virtual machine to support the guest memory page set during greedy ballooning.

17. The virtual machine manager of claim 16, wherein the virtual machine worker process is configured to adjust a reduction request pace based on a memory use pressure report of the virtual machine.

18. The virtual machine manager of claim 16, wherein the virtual machine worker process is configured to assign additional guest memory pages.

19. The virtual machine manager of claim 16, wherein a guest operating system of the virtual machine selects the predecessor guest memory page.

20. The virtual machine manager of claim 16, wherein the virtual machine worker processor is configured to assign the system memory page to the successor guest memory page upon access by the virtual machine.

\* \* \* \* \*